(12) United States Patent
Gooden et al.

(10) Patent No.: US 8,186,628 B2
(45) Date of Patent: May 29, 2012

(54) MULTI-AXIS ARTICULATED SOLAR LIGHT SHADE FOR SPACE-BASED SENSORS

(75) Inventors: Dominic R. Gooden, Redondo Beach, CA (US); Andrew J. Avrick, Redondo Beach, CA (US); Lacy G. Cook, El Segundo, CA (US); Ronald C. Loveridge, Redondo Beach, CA (US); John S. Hoos, West Hills, CA (US)

(73) Assignee: Raytheon Company, Waltham, MA (US)

( * ) Notice: Subject to any disclaimer, the term of this patent is extended or adjusted under 35 U.S.C. 154(b) by 205 days.

(21) Appl. No.: 12/540,124

(22) Filed: Aug. 12, 2009

(65) Prior Publication Data

US 2011/0037003 A1 Feb. 17, 2011

(51) Int. Cl.
*B64G 1/52* (2006.01)
(52) U.S. Cl. ................... 244/171.7; 250/515.1
(58) Field of Classification Search .................. 362/356; 250/515.1; 359/611; 244/171.7
See application file for complete search history.

(56) References Cited

U.S. PATENT DOCUMENTS

| | | | |
|---|---|---|---|
| 3,840,883 A * | 10/1974 | Choate | 396/448 |
| 4,598,981 A | 7/1986 | Hallam et al. | |
| 4,725,023 A * | 2/1988 | Shiki | 244/158.1 |
| 5,189,554 A | 2/1993 | Vanasse et al. | |
| 5,384,661 A | 1/1995 | Geyer et al. | |
| 5,526,178 A | 6/1996 | Goldstein | |
| 5,626,315 A * | 5/1997 | Flament et al. | 244/168 |
| 6,199,988 B1 * | 3/2001 | Krawczyk | 359/601 |
| 6,269,227 B1 * | 7/2001 | Hamasaki et al. | 396/534 |

(Continued)

FOREIGN PATENT DOCUMENTS

WO WO 02/18208 3/2002

OTHER PUBLICATIONS

Daniel Hsu, Hubble's Optics, Dec. 20, 2004, National Aeronautics and Space Administration.*

(Continued)

*Primary Examiner* — Jack Berman
*Assistant Examiner* — Jason McCormack
(74) *Attorney, Agent, or Firm* — Thorpe North & Western LLP (57) ABSTRACT

In one or more embodiments, a multi-axis articulated solar light shade that protects elements of a space-based sensor from direct solar illumination includes a base; a partial conical baffle tube having a first end portion, a second end portion, an elongated curved portion defining a shade between the first and second end portions, and an opening defined in an interior of the elongated curved portion, the first end portion rotatably attached to the base; and a visor pivotably attached to the second end portion. The partial conical baffle tube may be selectively rotated about a sensor line-of-sight in response to the sun's position relative to the sensor line-of-sight; and the visor may be selectively pivoted relative to the partial conical baffle tube in response to the sun's position relative to the sensor line-of-sight so as to protect the sensor from the direct solar illumination at any given time or any given orbital position.

16 Claims, 11 Drawing Sheets

U.S. PATENT DOCUMENTS

| | | | | |
|---|---|---|---|---|
| 6,443,634 | B1* | 9/2002 | Tsuboi | 396/448 |
| 7,631,653 | B2* | 12/2009 | Young et al. | 135/15.1 |
| 2004/0201896 | A1 | 10/2004 | Lundgren et al. | |
| 2005/0174647 | A1 | 8/2005 | Fischbach et al. | |
| 2009/0002823 | A1* | 1/2009 | Law et al. | 359/511 |
| 2009/0065647 | A1* | 3/2009 | Alis et al. | 244/171.7 |
| 2009/0205636 | A1* | 8/2009 | Gangemi | 126/573 |
| 2009/0320827 | A1* | 12/2009 | Thompson et al. | 126/576 |
| 2010/0100322 | A1* | 4/2010 | Leijtens | 701/222 |
| 2010/0284078 | A1* | 11/2010 | Bertuccio et al. | 359/507 |

OTHER PUBLICATIONS

Frank Bartko and the ACS Science Team, Operations and Data Management Plan for the Advanced Camera for Surveys, Dec. 2, 1998, Ball Aerospace Systems Division Ball Aerospace and Technologies Corporation, p. 17-18.*

GlobalSecurity.org. Military. FY01 Annual Report, "Space-Based Infrared System (SBIRS)". Nov. 11, 2008 <http://www.globalsecurity.org/military/library/budget/fy2001/dot-e/airforce/01sbirs.html>.

* cited by examiner

MULTI-AXIS ARTICULATED SOLAR LIGHT SHADE FOR SPACE-BASED SENSORS

BACKGROUND

The present disclosure relates to protection of element(s) of a space-based sensor from direct solar illumination and in particular to a multi-axis articulated solar light shade that protects the element(s) of a space-based sensor from direct solar illumination.

Direct solar illumination of the elements of a space-based sensor, for example, optical elements, can cause scattering of the sunlight to various parts of the space-based sensor field-of-view which can lead to degradation of the imagery by increasing photon levels impinging upon a detector. Also, direct solar illumination can cause temperature increases that distort the location, optical figure, and/or change the refractive index of the optical elements and thereby degrade the quality of sensor performance.

Conventionally, a fixed flat-panel sunshade with an integrated visor has been used to protect elements of space-based sensors from solar illumination. One example of such a sunshade is used in SBIRS (Space-Based Infrared System) satellites by Lockheed Martin. This type of fixed sunshade is attached to a space-based vehicle, for example, a spacecraft, and is used to protect elements of multiple space-based sensors on the spacecraft bus from unwanted solar illumination. Since, the sunshade is fixed to the spacecraft (i.e., does not independently move), the spacecraft is required to constantly maneuver to keep unwanted sunlight off the sensors. This increases the spacecraft system cost and complexity due to: i) the cost and complexity increases in the bus maneuvering system; ii) manpower increases at ground station; iii) cost and complexity increases of the optical bench stabilization system due to transient disturbances from bus maneuvering; and iv) cost and complexity increases of the inertial navigation system responsible for spacecraft positional knowledge and associated image processing to correct for maneuvering.

What is needed is a system and method that provides a multi-axis articulated solar light shade that protects elements of a space-based sensor from direct solar illumination without requiring the additional cost and complexity that other methods require while preventing sensor performance degradation.

SUMMARY

In an embodiment, a multi-axis articulated solar light shade comprises a base; a partial conical baffle tube having a first end portion, a second end portion, an elongated curved portion defining a shade between the first and second end portions, and an opening defined in an interior of the elongated curved portion, the first end portion rotatably attached to the base; and a visor pivotably attached to the second end portion.

In an embodiment, a method of protecting elements of a space-based sensor from direct solar illumination includes using a multi-axis articulated solar light shade comprising a partial conical baffle tube and a visor attached to an end portion of the partial conical baffle tube. The method comprises selectively rotating the partial conical baffle tube about a sensor line-of-sight in response to the sun's position relative to the sensor line-of-sight; and selectively pivoting the visor relative to the partial conical baffle tube in response to the sun's position relative to the sensor line-of-sight, wherein the partial conical baffle tube is selectively rotated and the visor is selectively pivoted so as to protect the sensor from the direct solar illumination at any given time and any given orbital position.

In an embodiment, a system for protecting elements of a space-based sensor from direct solar illumination includes a space-based sensor comprising an optical element; and a light shade comprising a base; a partial conical baffle tube having a first end portion, a second end portion, an elongated curved portion defining a shade between the first and second end portions, and an opening defined in an interior of the elongated curved portion, the first end portion rotatably attached to the base; and a visor pivotably attached to the second end portion, wherein the light shade is located around an aperture of the optical element and arranged to protect the optical element from the direct solar illumination.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

Figure 1:
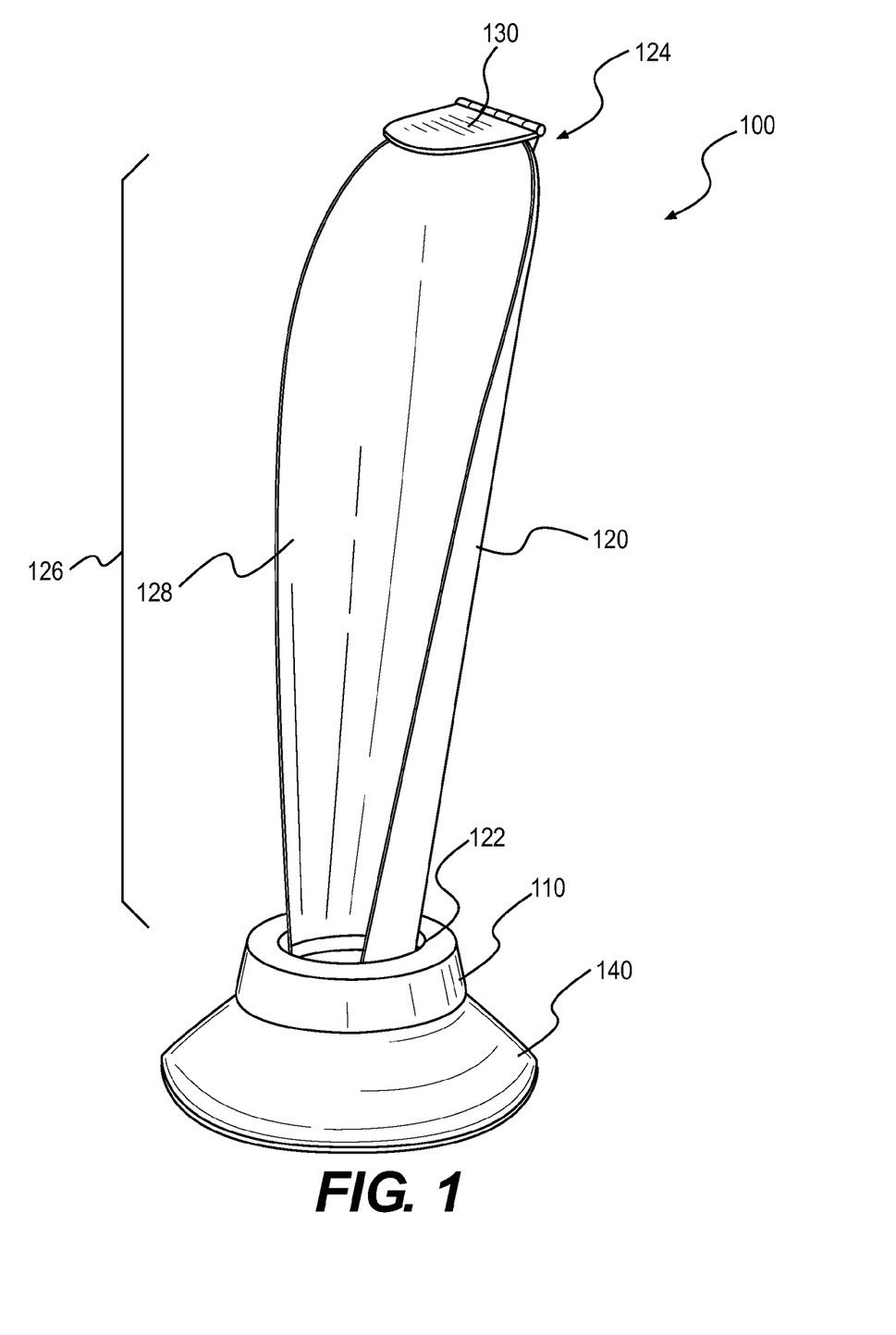
FIG. 1 is an exemplary illustration of a multi-axis articulated solar light shade, according to an embodiment.

FIG. 1 is an exemplary illustration of multi-axis articulated solar light shade 100 comprising base 110; partial conical baffle tube 120 having first end portion 122, second end portion 124, elongated curved portion 126 defining a shade between the first and second end portions, and opening 128 defined in an interior of the elongated curved portion. First end portion 122 is rotatably attached to base 110 and visor 130 is pivotably attached to second end portion 124.

In one embodiment, base 110 is designed as a structural member that serves as a structural anchor point for the whole assembly of light shade 100. In one embodiment, base 110 is attached to sensor structural member 140.

In one embodiment, elongated curved portion 126 of partial conical baffle tube 120 has a tapered or conical configuration, wherein the shape of the elongated curved portion at second end portion 124 is broader than the shape of the elongated curved portion at first end portion 122. In other words, the shape of elongated curved portion 126 gradually narrows from second end portion 124 to first end portion 122. In one embodiment, elongated curved portion 126 is shaped and constructed so as to be curved inwardly to define an interior portion thereof. In one embodiment, opening 128 is defined in the interior of elongated curved portion 126.

In one embodiment, first end portion 122 of partial conical baffle tube 120 is rotatably attached to base 110. In one embodiment, visor 130 is pivotably attached to second end portion 124 of partial conical baffle tube 120. In one embodiment, partial conical baffle tube 120 and visor 130 are constructed using a lightweight material, with high modulus and thermal conductivity, and having a low coefficient of thermal expansion. In one embodiment, the lightweight material is a graphite epoxy material. In one embodiment, base 110 and sensor structural member 140 are also constructed using the same lightweight material as partial conical baffle tube 120 and visor 130.

Figure 2A:
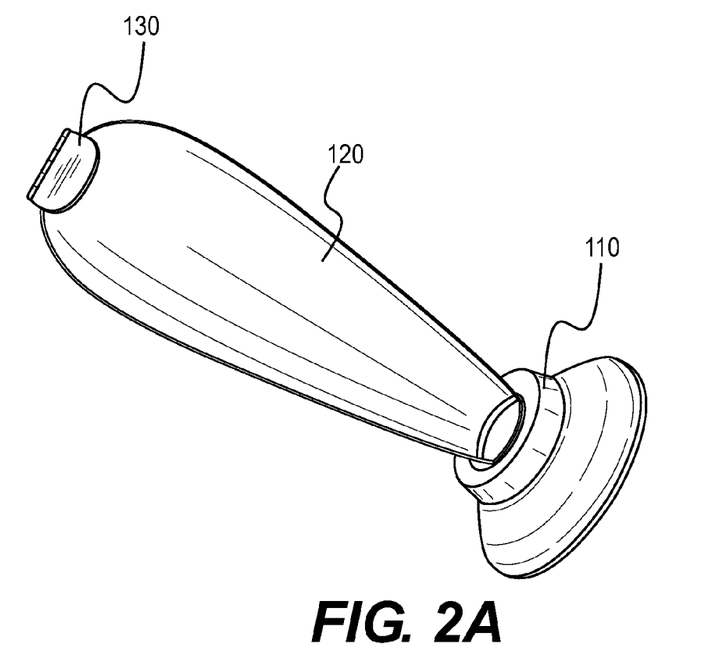
FIGS. 2A and 2B depict the front and rear views of a multi-axis articulated solar light shade, in accordance with an embodiment.
Figure 2B:
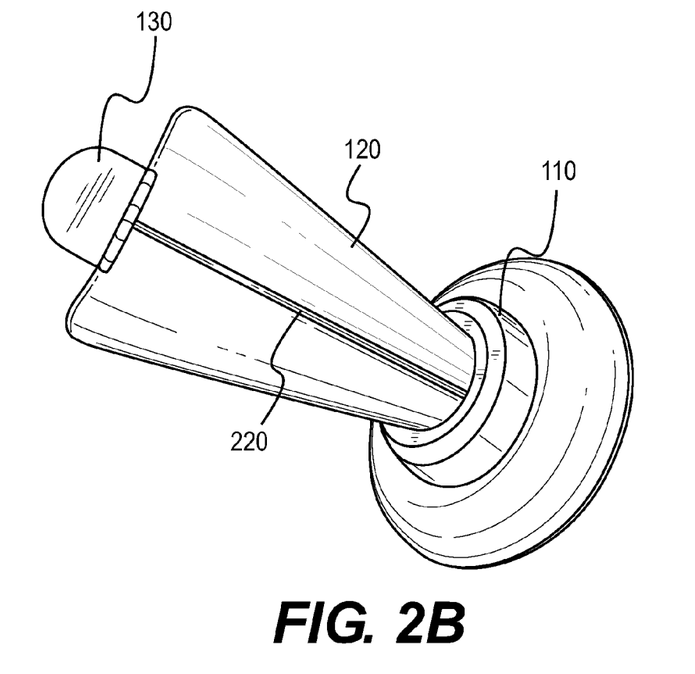
Figure 3:
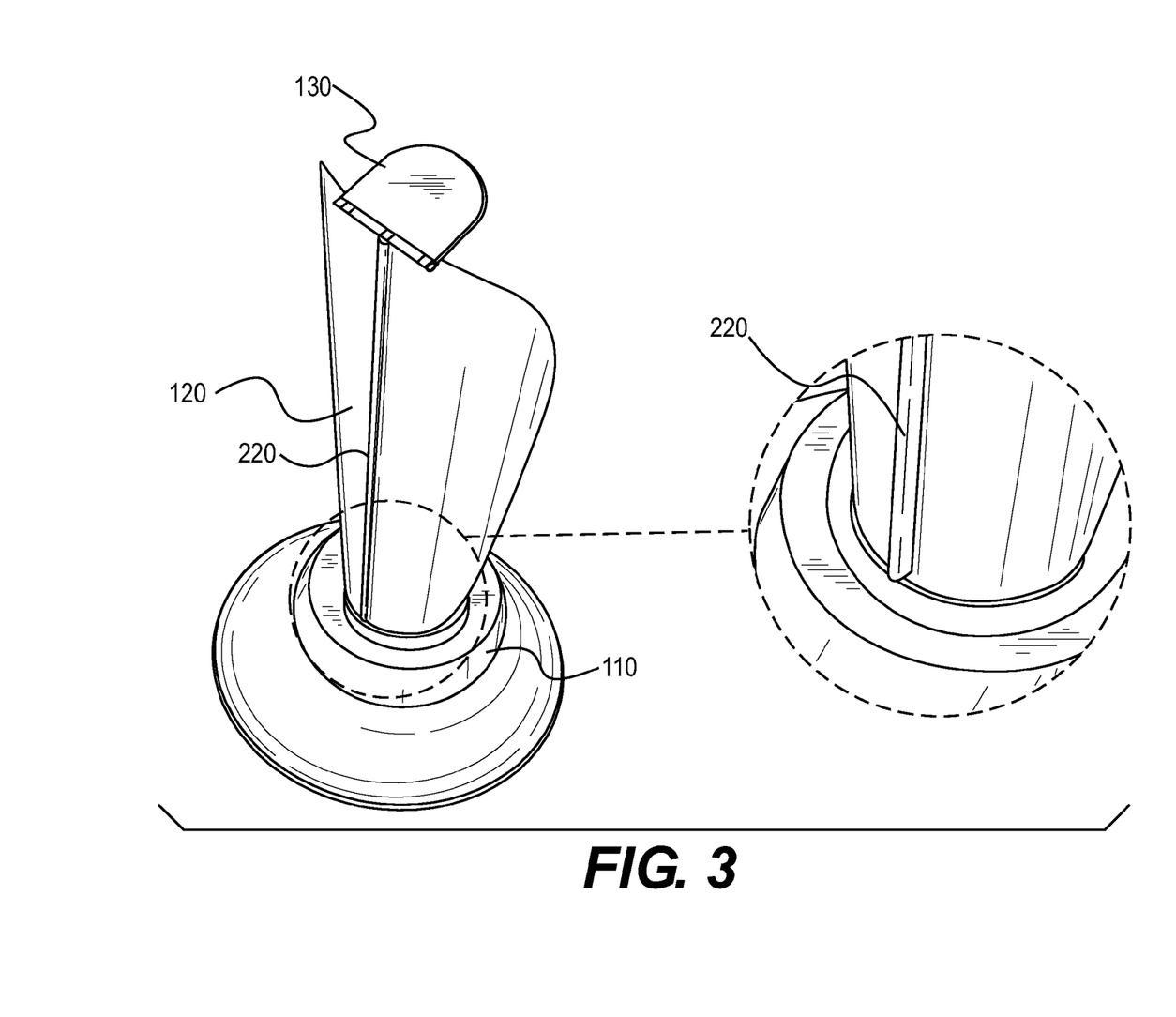
FIG. 3 is a detailed view of a portion of an enclosed channel housed by a multi-axis articulated solar light shade, in accordance with an embodiment.

FIGS. 2A and 2B depict the front and rear views of multi-axis articulated solar light shade 100, respectively. As can be seen from the rear view of the light shade, a rear surface of elongated curved portion 126 of partial conical baffle tube 120 houses enclosed channel 220. FIG. 3 depicts a detailed view of a portion of enclosed channel 220. In one embodiment, enclosed channel 220 runs along the length of partial conical baffle tube 120.

Figure 4:
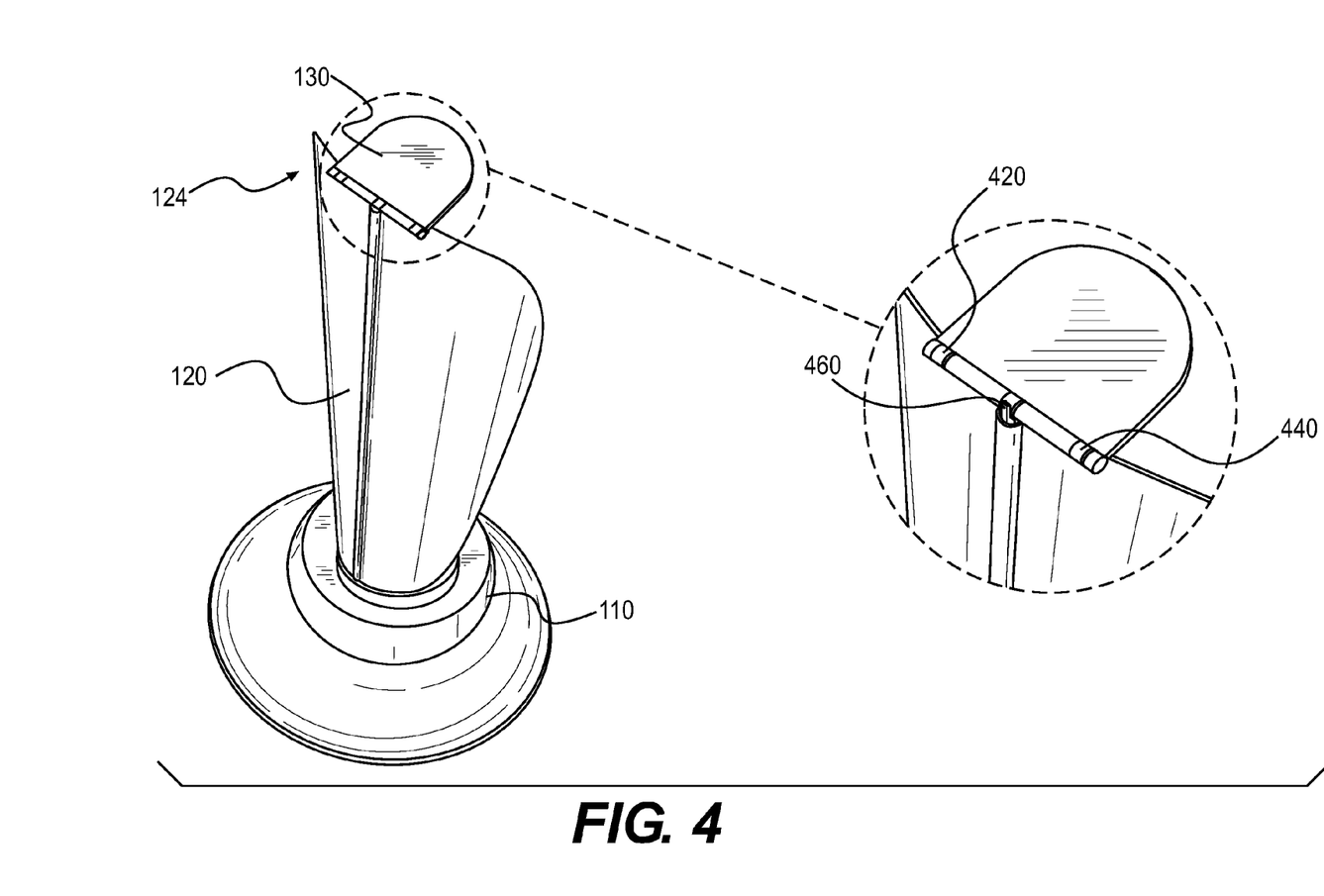
FIG. 4 is a detailed view of a visor of a multi-axis articulated solar light shade, in accordance with an embodiment.

FIG. 4 depicts a detailed view of visor 130 of light shade 100. In one embodiment, visor 130 is attached to second end portion 124 of partial conical baffle tube 120. In one embodiment, visor 130 is attached to second end portion 124 at two hinge points 420 and 440. One of ordinary skill in the art will recognize that various lightweight hinge mechanisms may be utilized to attach visor 130 to second end portion 124. In one embodiment, pushrod 460 is provided inside enclosed channel 220 and one end of pushrod 460 is attached to visor 130 as shown in FIG. 4.

Figure 5:
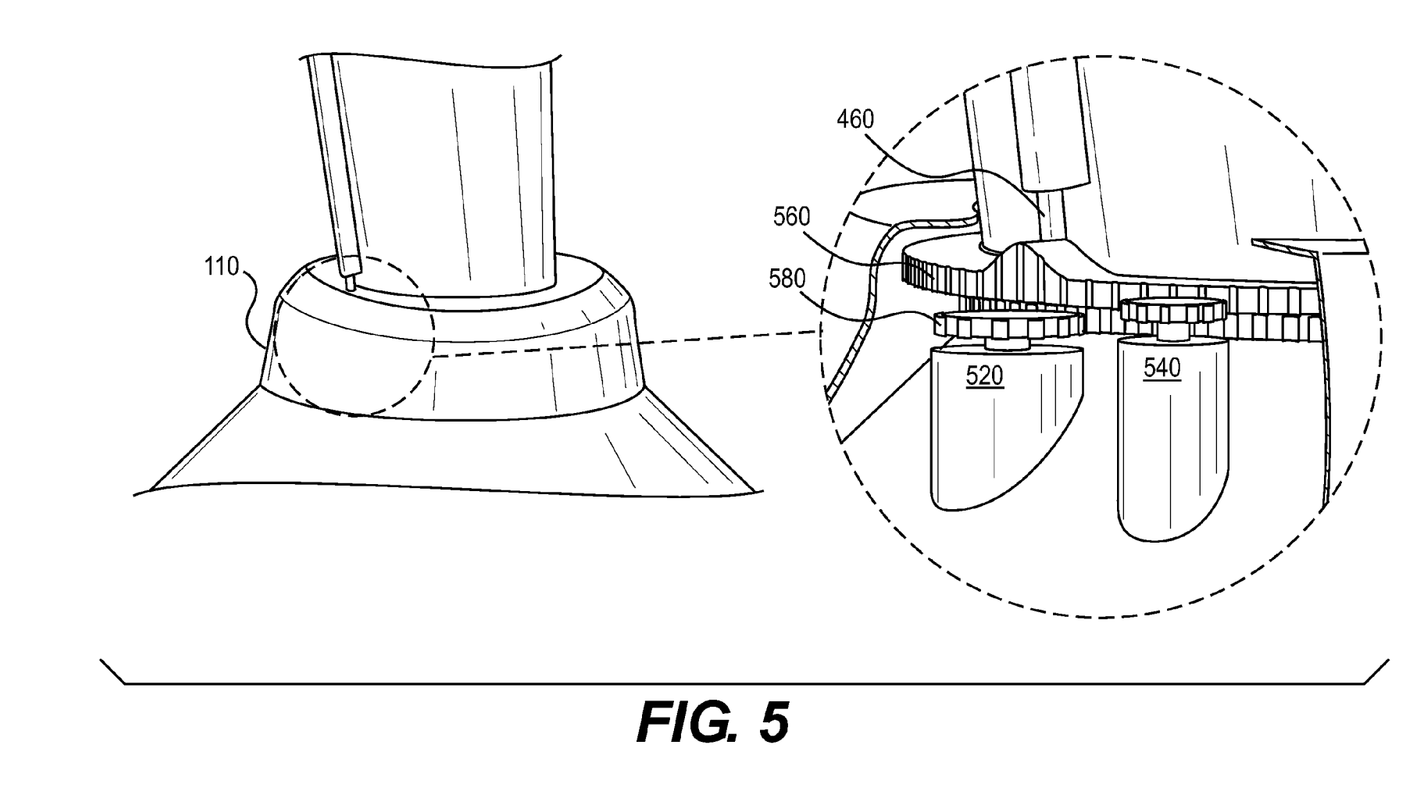
FIG. 5 is a detailed view of a base of a multi-axis articulated solar light shade, in accordance with an embodiment.

FIG. 5 depicts a detailed view of base 110 of light shade 100. In one embodiment, base 110 houses motor 520 that is configured to rotate partial conical baffle tube 120 relative to base 110. In one embodiment, base 110 houses motor 540 that is configured to pivot visor 130 relative to partial conical baffle tube 120. In one embodiment, motor 540 is configured to pivot visor 130 on hinge points 420 and 440. In one embodiment, motor 540 is configured to drive pushrod 460 to pivot visor 130 relative to partial conical baffle tube 120. In one embodiment, motor 520 and motor 540 are electric motors. In one embodiment, motor 520 and motor 540 are servo motors, each having an internal resolver/encoder that relays the motor's position to controller 900, described in more detail below. The position of partial conical baffle tube 120 and visor 130 may be inferred from the angular position of their respective servo motors due to rigid mechanical linkage between them, in one aspect of this embodiment. One of ordinary skill in the art will recognize that other well-known mechanisms may be used to pivot visor 130 relative to partial conical baffle tube 120.

In one embodiment, a distal end of pushrod 460 that is not attached to visor 130 extends beyond enclosed channel 220 and enters base 110. In one embodiment, the distal end of pushrod 460 continuously contacts a cam lobe on main gear mechanism 560 that is mechanically linked to motor 540. In one embodiment, motor 540 causes gear mechanism 560 to rotate, and pushrod 460 achieves required linear motion from the movement of the cam lobe on gear mechanism 560. In one embodiment, motor 520 causes gear mechanism 580 to rotate. In one embodiment, first end portion 122 is mechanically linked to gear mechanism 580 and partial conical baffle tube 120 achieves rotational motion due to the mechanical linkage between motor 520 and gear mechanism 580. The mechanisms for rotation of partial conical baffle tube 120 and pivoting of visor 130 are not limited to the embodiments described herein and other mechanisms can also be used.

In one embodiment, base 110 is designed to prevent contamination of these internal components of light shade 100.

Figure 6:
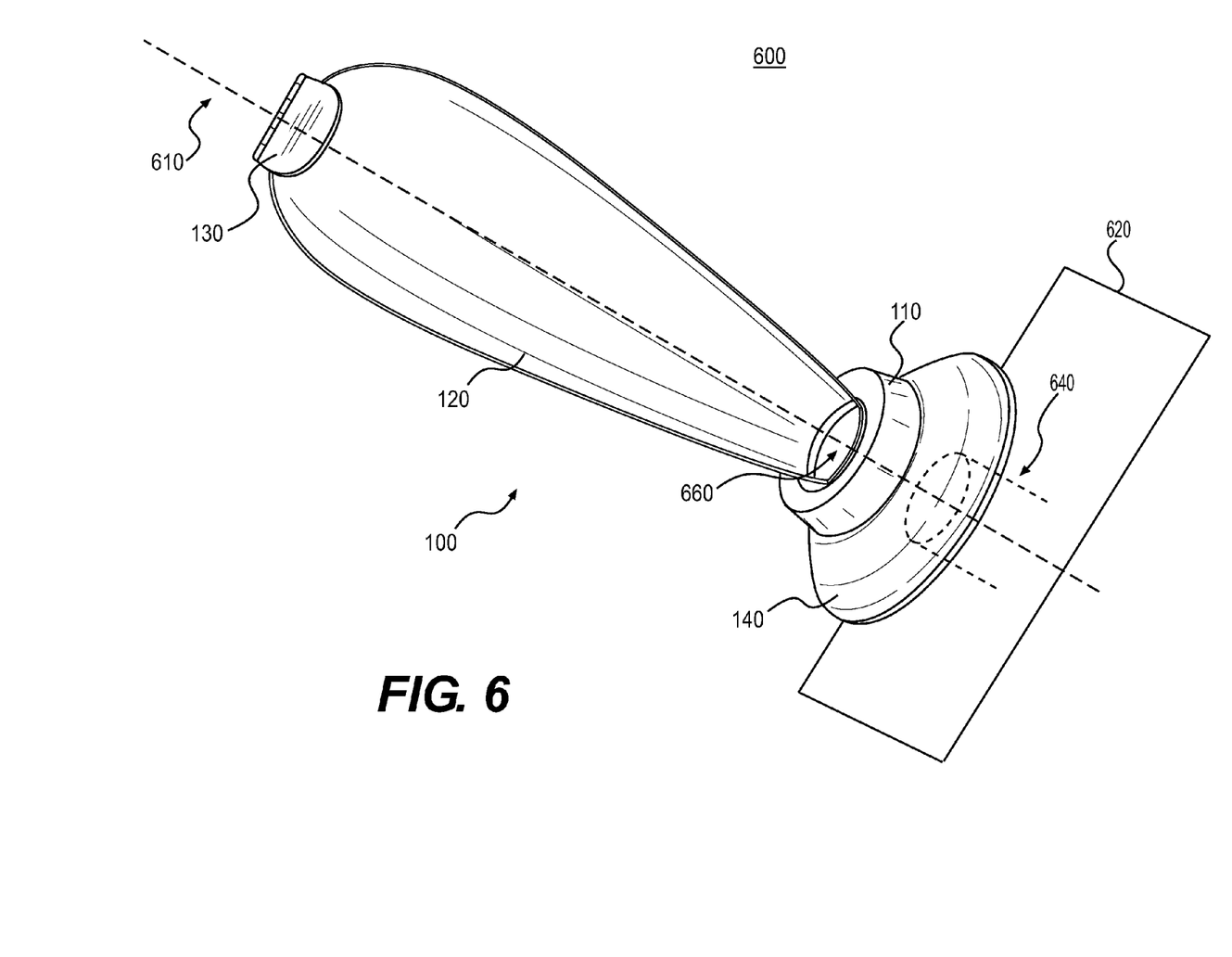
FIG. 6 is an exemplary illustration of a system comprising a multi-axis articulated solar light shade located around an aperture of an optical element of a space-based sensor, in accordance with an embodiment.

FIG. 6 is an exemplary illustration of system 600 comprising light shade 100 and space-based sensor 620, wherein light shade 100 is located around an aperture of optical element 640 (shown in dotted lines for clarity purposes) of space-based sensor 620 and protects the optical element 640 from direct solar illumination. In one embodiment, circular opening 660 defined by partial conical baffle tube 120 and base 110 coincides with the aperture of the optical element 640. In one embodiment, the diameter of circular opening 660 may or may not be the same as the aperture diameter. In one embodiment, opening 660 may be equal to or greater than the aperture diameter depending on the position of the optics pupil relative to optical element 640 as detailed in FIGS. 8A, 8B, and 8C. Opening 660 may pass the entire aperture for all parts of the field of view. If the optics pupil is coincident with optical element 640, for example, opening 660 may be equal to the aperture diameter (plus some margin for tolerances). In one embodiment, partial conical baffle tube 120 resides just outside the field-of-view of optical element 640. In one embodiment, optical element 640 is the first element of space-based sensor 620. In one embodiment, space-based sensor 620 comprises a telescope and optical element 640 is the first element of the telescope. In one embodiment, the space-based sensor is housed in a space-based vehicle, for example, satellite, spacecraft, or other space-based vehicle (not shown). In one embodiment, the space-based sensor is in a geosynchronous orbit. In one embodiment, the size of visor 130 is slightly larger than the size of optical element 640 (i.e., the aperture diameter of optical element 640) to prevent sun's rays that are being diffracted by visor 130 to enter the aperture under all conditions including tolerances associated with the position of visor 130.

In one embodiment, sensor structural member 140 is attached to a host sensor (i.e., a sensor that hosts light shade 100) or a space-based vehicle bus (not shown). In one embodiment, base 110 is directly attached to the space-based vehicle bus. In one embodiment, base 110 provides an electrical/mechanical interface between light shade 100 and its host sensor or space-based vehicle bus.

In one embodiment, partial conical baffle tube 120 is selectively rotated about sensor line-of-sight 610 in response to a sun's position relative to sensor line-of-sight 610. In one embodiment, visor 130 is selectively pivoted relative to partial conical baffle tube 120 in response to the sun's position relative to the sensor line-of-sight 610. Thus, partial conical baffle tube 120 may be selectively rotated and visor 130 may be selectively pivoted to ensure that optical element 640 is protected from the direct solar illumination at any given time and any given orbital position. One advantage of this is that a spacecraft that houses optical element 640 which light shade 100 is trying to protect from direct solar illumination does not have to be constantly maneuvered to keep sunlight off optical element 640. This allows light shade 100 and optical element 640 to be integrated onto less complicated and more cost effective commercial buses.

The sun's position relative to sensor line-of-sight 610 may be described with respect to the sun's radial angle and sun's polar angle relative to sensor 620/sensor line-of-sight 610. In one embodiment, partial conical baffle tube 120 is selectively rotated about sensor line-of-sight 610 in response to the sun's polar angle. In one embodiment, visor 130 is selectively pivoted relative to partial conical baffle tube 120 in response to the sun's radial angle.

FIGS. 7A to 7J provide an exemplary depiction of the rotating and pivoting movements of partial conical baffle tube 120 and visor 130 in response to the sun's position relative to the sensor line-of-sight 610. It is noted that partial conical baffle tube 120 is denoted as partial tube 120 in FIGS. 7A to 7J merely for compact representation. FIGS. 7A to 7J, in sequence, depict the configuration of partial conical baffle tube 120 and visor 130, as the sun continuously moves up from bottom of sensor 620 to top of sensor 620 along a vertical plane. Also, in FIGS. 7A to 7J, horizontal parallel dashed lines AA and BB represent the center of the sensor field-of-view. Parallel dashed lines EE and FF represent the top of the sensor field-of-view. Parallel dashed lines CC and DD represent the bottom of the sensor-field of view.

Figure 7A:
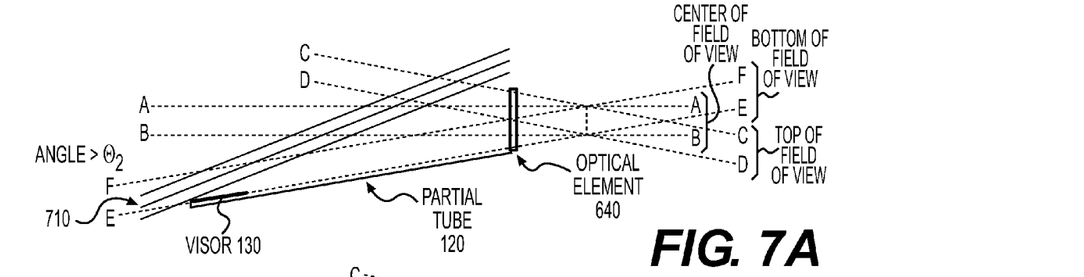
FIGS. 7A-7J depict the pivoting and rotating movements of the visor and the partial conical baffle tube in response to the sun's position relative to sensor line-of-sight, in accordance with an embodiment.

FIG. 7A depicts the configuration of partial conical baffle tube 120 and visor 130 when the sun is at the bottom of sensor 620 and the sun's radial angle is greater than a first angle. In this configuration, visor 130 is in a non-operational mode. In the non-operational mode, visor 130 is in an unused position (in other words, "folded in" or in a stowed position). In the unused position, visor 130 does not contribute to the protection of optical element 640 from sun rays 710. Partial conical baffle tube 120 protects optical element 640 from sun rays 710 in this configuration. In this configuration, neither visor 130 pivots, nor partial conical baffle tube 120 rotates. In one embodiment, the first angle may be an angle of about 20 degrees.

Figure 7B:
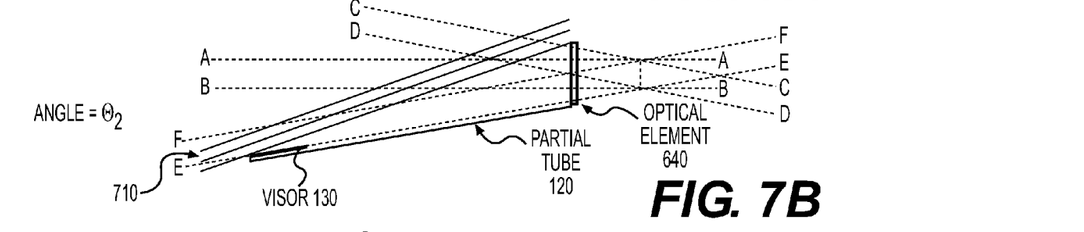

As the sun moves from the bottom of sensor 620 towards the top of sensor 620, when the sun's radial angle is equal to the first angle, as shown in FIG. 7B, visor 130 is still in the unused position, and partial conical baffle tube 120 still protects optical element 640 from sun rays 710. As can be seen in FIG. 7B, when the sun's radial angle is equal to the first angle, sun rays 710 have almost reached the edge of optical element 640. Again, in this configuration, neither visor 130 pivots, nor does partial conical baffle tube 120 rotate.

Figure 7C:
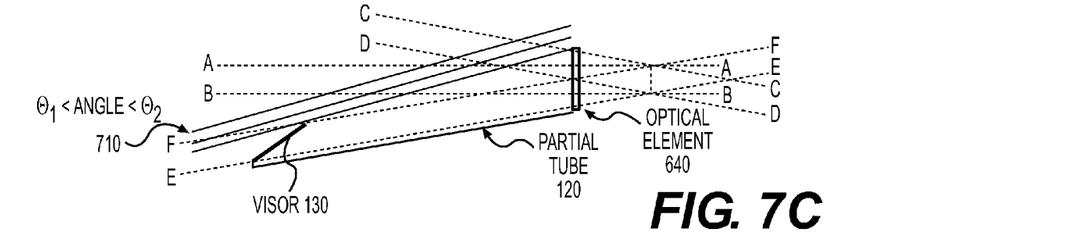

The configuration of partial conical baffle tube 120 and visor 130 when the sun's radial angle is between the first angle and a second angle, wherein the second angle is smaller than the first angle, is depicted in FIG. 7C. In this configuration, visor 130 is in an operational mode. In the operational mode, visor 130 is pivoted relative to partial conical baffle tube 120 in response to the sun's radial angle such that visor 130 is partially extended into the field of view of optical element 640. In other words, in the operational mode, visor 130 is moved from the unused position to a partially extended position in which visor 130 contributes to the protection of optical element 640 from sun rays 710. As such, in this configuration, both visor 130 and partial conical baffle tube 120 protect the optical element from the sun rays 710. As can be seen in FIG. 7C, sun rays 710 do not enter the aperture of optical element 640. As such, in this configuration, while visor 130 selectively pivots, partial conical baffle tube 120 does not rotate. In one embodiment, the second angle may be an angle of about 9 degrees.

Figure 7D:
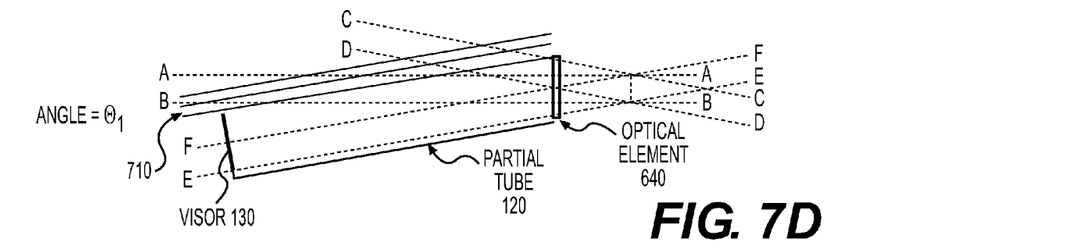

The configuration of partial conical baffle tube 120 and visor 130 when the sun's radial angle is equal to the second angle, is depicted in FIG. 7D. In this configuration, visor 130 is still in the operational mode, wherein visor 130 is further pivoted relative to partial conical baffle tube 120 in response to the sun's radial angle, such that visor 130 is fully extended into the field of view of optical element 640. In this configuration, both visor 130 and partial conical baffle tube 120 protect the optical element from sun rays 710. In one embodiment, optical element 640 is primarily protected from sun rays 710 by visor 130. As can be seen in FIG. 7D, sun rays 710 do not enter the aperture of optical element 640. Also, in this configuration, while visor 130 selectively pivots, partial conical baffle tube 120 does not rotate.

Figure 7E:
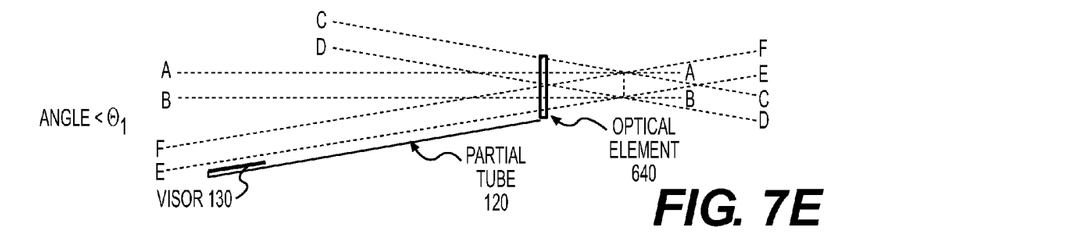

FIG. 7E depicts the configuration of partial conical baffle tube 120 and visor 130 when the sun's radial angle is less than the second angle. The earth blocks sun's rays at angles less than the second angle (i.e., the earth eclipses the sun). In this configuration, visor 130 is pivoted back to the unused position. No further pivoting movement of visor 130 takes place and partial conical baffle tube 120 also does not rotate in this configuration as there are no sun rays that need to be blocked from entering the aperture of optical element 640.

Figures 7F, 7G:
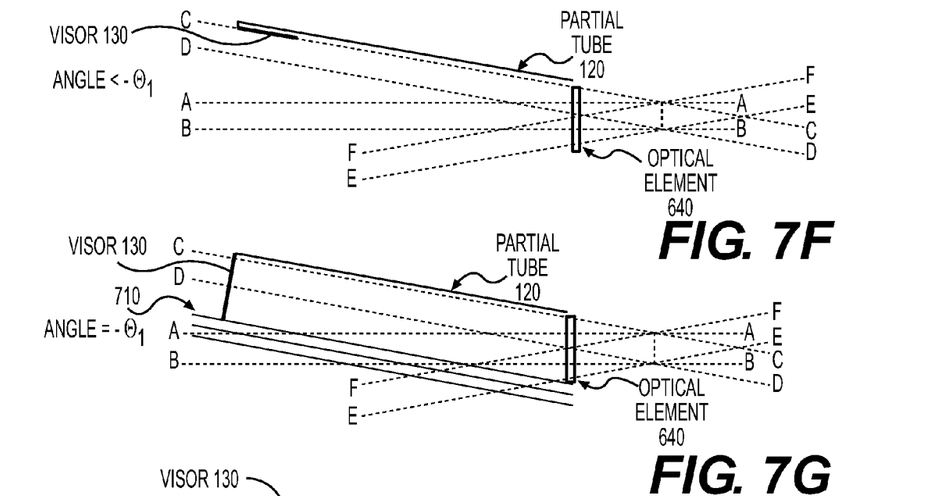

FIG. 7F depicts the configuration of partial conical baffle tube 120 and visor 130, as the sun's radial angle and the sun's polar angle change in response to the sun's further movement to top of sensor 620. In one embodiment, the sun's radial angle is less than a third angle. At this angle, visor 130 is not pivoted and is still in the unused position. However, partial conical baffle tube 120 rotates about sensor line-of-sight 610 in response to the change in the sun's polar angle (not shown). As can be seen in FIG. 7F, partial conical baffle tube 120 is rotated from a position below optical element 640 to a position above optical element 640, for example, the partial conical baffle tube may rotate 180 degrees in response to the sun's polar angle. In this configuration, even though visor 130 and partial conical baffle tube 120 are not needed to block the sun's rays because the earth still blocks the sun's rays, partial conical baffle tube 120 is rotated in anticipation of the its involvement required in blocking the sun's rays as the sun starts rising above the top of the earth. In one embodiment, the third angle may be an angle of about −9 degrees.

As the sun continues to move from the bottom to top of sensor 620 and rises above the top of the earth, FIG. 7G depicts the configuration of partial conical baffle tube 120 and visor 130 when the sun's radial angle is equal to the third angle. In this configuration, visor 130 is in an operational mode, wherein visor 130 is pivoted relative to partial conical baffle tube 120 in response to the sun's radial angle, such that visor 130 is fully extended into the field of view of optical element 640. In this configuration, both visor 130 and partial conical baffle tube 120 protect the optical element from sun rays 710. In one embodiment, optical element 640 is primarily protected from sun rays 710 by visor 130. As can be seen in FIG. 7G, sun rays 710 do not enter the aperture of optical element 640. Also, in this configuration, while visor 130 selectively pivots, partial conical baffle tube 120 does not rotate.

Figure 7H:
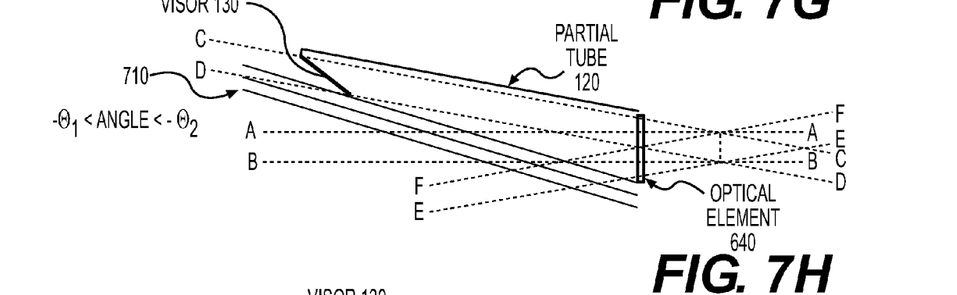

FIG. 7H depicts the configuration of partial conical baffle tube 120 and visor 130 when the sun's radial angle is between the third angle and a fourth angle, wherein the fourth angle is greater than the third angle. In this configuration, visor 130 is in an operational mode, wherein visor 130 is pivoted relative to partial conical baffle tube 120 in response to the sun's radial angle, such that visor 130 is partially extended into the field of view of optical element 640. In this configuration, both visor 130 and partial conical baffle tube 120 protect the optical element from sun rays 710. As can be seen in FIG. 7G, sun rays 710 do not enter the aperture of optical element 640. Also, in this configuration, while visor 130 pivots, partial conical baffle tube 120 does not rotate. In one embodiment, the fourth angle may be an angle of about −20 degrees.

Figures 7I, 7J:
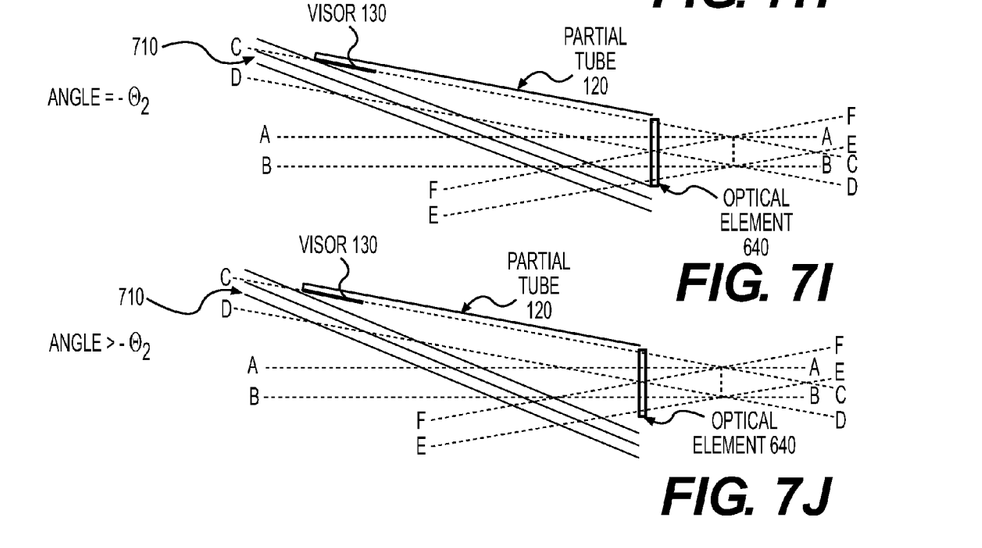

FIG. 7I depicts the configuration of partial conical baffle tube 120 and visor 130 when the sun's radial angle is equal to the fourth angle. In this configuration, visor 130 is in a non-operational mode, wherein visor 130 is pivoted back to the unused position. In the unused position, visor 130 does not contribute to the protection of optical element 640 from sun rays 710. Partial conical baffle tube 120 protects optical element 640 from the sun rays 710. In this configuration, neither visor 130 pivots, nor partial conical baffle tube 120 rotates.

FIG. 7J depicts the configuration of partial conical baffle tube 120 and visor 130 when the sun's radial angle is greater than the fourth angle. In this configuration, visor 130 is still in the unused position, and partial conical baffle tube still protects optical element 640 from sun rays 710. In this configuration, neither visor 130 pivots, nor partial conical baffle tube 120 rotates.

As can be seen in FIGS. 7A-7I, the rotating movement of partial conical baffle tube 120 in response to the sun's polar angle, and the pivoting movement of visor 130 in response to the sun's radial angle prevent sun rays from entering the aperture of optical element 640 thereby protecting optical element 640 from direct solar illumination. Visor 130, when in the partially extended or fully extended positions, as described above, contributes to the protection of optical element 640 from sun rays 710. As such, in various configurations where visor 130 is in the partially extended or fully extended positions, both visor 130 and partial conical baffle tube 120 protect optical element 640 from sun rays 710. Whereas, at least in some configurations, where visor 130 is in the unused position, partial conical baffle tube 120 protects optical element 640 from sun rays 710. Also, while the embodiments of FIG. 7A-7I depict the unused position of visor 130 as a "folded in" position, in other embodiments, visor 130 in the unused position may be in a "folded out" position (in other words, completely "folded out" instead of "folded in"). One of ordinary skill in the art would recognize that visor 130, in the operational mode, may be pivoted to different positions from the "folded out" position to achieve the same effect of protecting optical element 640 from sun rays 710 as described in FIGS. 7A-7J above.

In one embodiment, visor 130, when in the partially extended and fully extended positions, may obscure a small portion of the sensor field-of view, but this may be minimized to some extent by making partial conical baffle tube 120 as long as necessary and/or feasible. The small field-of-view blockage may be acceptable compared to degraded operation over the entire sensor field-of-view that would result from not using visor 130.

Figure 8A:
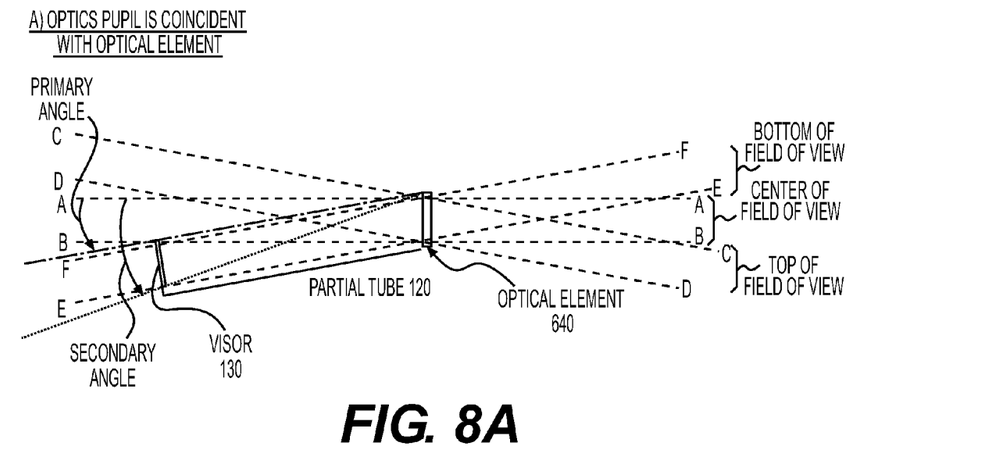
FIG. 8A depicts the light shade geometry when the optics pupil is at the optical element.
Figure 8B:
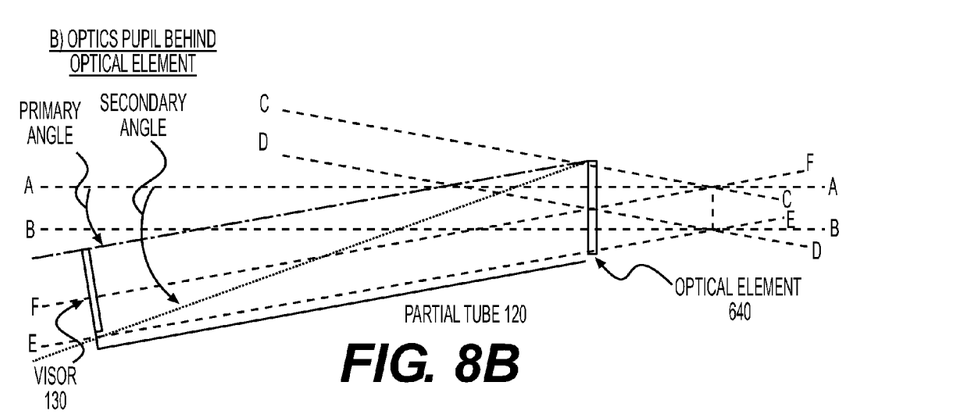
FIG. 8B depicts the light shade geometry when the optics pupil is behind the optical element.
Figure 8C:
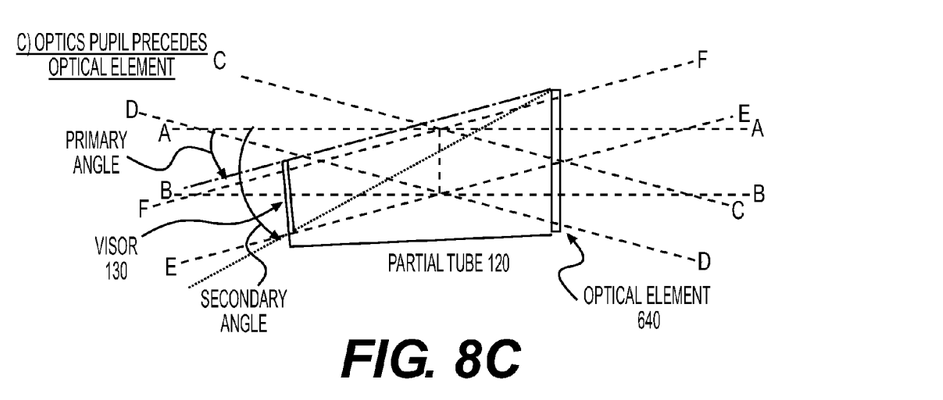
FIG. 8C depicts the light shade geometry when the optics pupil precedes the optical element, in accordance with an embodiment.

FIGS. 8A, 8B, and 8C depict light shade 100 having slightly different geometries depending on the position of the optics pupil relative to optical element 640, and an example field-of view blockage when visor 130 is in a fully extended position. It is noted that partial conical baffle tube 120 is denoted as partial tube 120 in FIGS. 8A to 8C merely for compact representation. In each of these figures, there is a secondary angle defined by a line from the edge of partial conical baffle tube 120 to the top of element 640 when visor 130 is in the unused position (not shown). When the sun is outside this secondary angle, element 640 is protected by partial conical baffle tube 120. There is also a primary angle defined by a line from the edge of visor 130 to the top of element 640, when visor 130 is in the fully extended position. When the sun in between this primary angle and the above defined secondary angle, element 640 is primarily protected by visor 130.

In one embodiment, FIG. 8A depicts the geometry of light shade 100 when the optics pupil is coincident with optical element 640. In FIG. 8A, visor 130, when in the fully extended position, just touches dashed line BB. Thus, in this configuration, visor 130 does not obscure any collecting area in the center of the sensor field-of-view. But visor 130 does obscure portions of the sensor aperture for field of view angles between dashed lines BB and EE.

In one embodiment, FIG. 8B depicts the geometry of light shade 100 when the optics pupil is behind optical element 640. In this configuration, partial conical baffle tube 120 is longer and visor 130 is larger than the partial conical baffle tubes and visors of FIGS. 8A and 8C. In FIG. 8B, visor 130, when in the fully extended position, is located well below dashed line BB. In this configuration, visor 130 does not obscure any collecting area in the center of the sensor field-of-view. Thus, making partial conical baffle tube 120 longer ensures that no collecting area is obscured in the center of the sensor field-of-view and for some additional field angles outside and down from dashed line BB. In this FIG. 8B, visor 130 does begin to obscure portions of the aperture farther out in the field view outside of dashed line BB, extending in the direction of dashed line EE.

In one embodiment, FIG. 8C depicts the geometry of light shade 100 when the optics pupil precedes optical element 640. In FIG. 8C, a portion of visor 130, when in the fully extended position, is located nearly in the middle of dashed lines AA and BB. Thus, in this configuration, visor 130 obscures nearly half of the collecting area in the center of the sensor field-of view.

In each of the configurations depicted in FIGS. 8A-8C, visor 130, when in fully extended position, obscures the entire collecting area in the bottom of the sensor field-of-view. In FIG. 8C, however, visor 130 also obscures a portion of the collecting area in the center of the sensor filed-of-view. As mentioned above, this small field-of-view blockage may be acceptable compared to degraded operation over the entire sensor field-of-view that would result from not using visor 130. The amount of aperture and field-of view that is blocked by visor 130 and still be acceptable may vary based on operational requirements. A lesser amount of blockage is desirable, which drives the length of partial conical baffle tube 120 to larger values.

Figure 9:
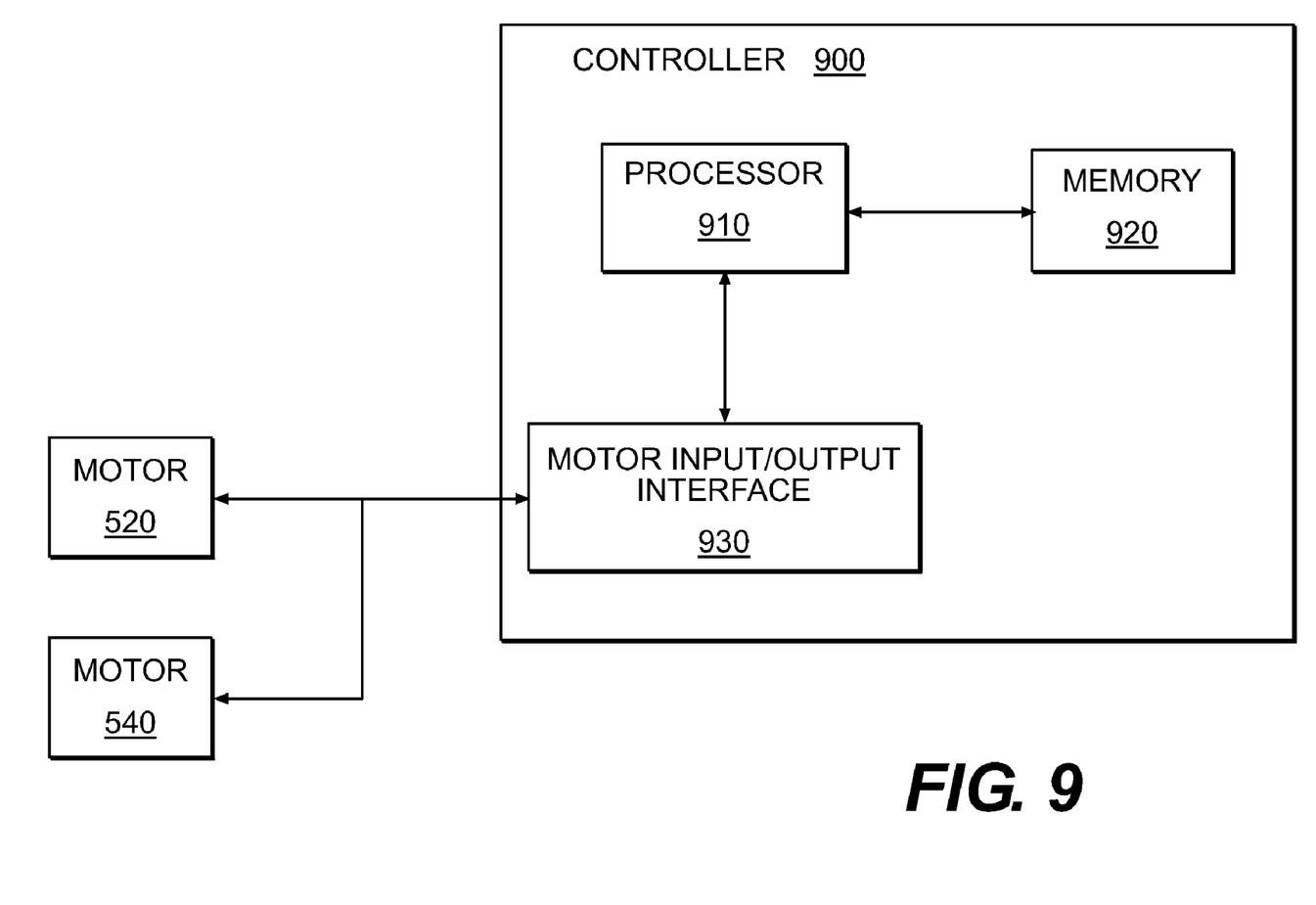
FIG. 9 is a schematic depiction of a controller for a multi-axis articulated solar light shade, in accordance with an embodiment.

FIG. 9 depicts controller 900 for light shade 100, in accordance with an embodiment. Controller 900 comprises processor 910, memory 920, motor input/output interface 930 and may include other elements. In one embodiment, processor 910 is configured to receive one or more inputs relating to the sun's position relative to the sensor line-of-sight and in response thereto, to provide one or more output signals to one or more motors 520, 540 that selectively rotate partial conical baffle tube 120 about the sensor line-of-sight and selectively pivot visor 130 relative to partial conical baffle tube 120, or both. In one embodiment, visor 130 is selectively pivoted relative to partial conical baffle tube 120 on an axis perpendicular to the sensor line-of-sight. In one embodiment, controller 900 may be housed in base 110. One of ordinary skill in the art would recognize that controller 900 can be housed elsewhere in the spacecraft as long as it can provide output signals to one or more motors 520, 540.

In one embodiment, memory 920 stores pre-programmed information regarding the sun's position relative to the sensor line-of-sight. In one embodiment, memory 920 contains pre-programmed information regarding the sun's position relative to the sensor line-of-sight at any given time (e.g., throughout the year) for a given geosynchronous orbit or other known orbit. Memory 920 provides the sun's position relative to the sensor line-of-sight as an input to processor 910. Processor 910, in response thereto, provides one or more output signals to motors 520 and 540 that either selectively rotates partial conical baffle tube 120 about the sensor line-of-sight, or selectively pivots visor 130 relative to partial conical baffle tube 120, or both. For example, in one embodiment, processor 910 may provide one or more output signals to motor 520 to selectively rotate partial conical baffle tube 120 about the sensor line-of-sight in response to the sun's polar angle, and processor 910 may provide one or more output signals to motor 540 to selectively pivot visor 130 relative to partial conical baffle tube 120 in response to the sun's radial angle.

In one embodiment, processor 910 receives an input regarding the sun's position relative to the sensor line-of-sight from a sun position sensor (not shown). The sun position sensor may actively track the sun's position relative to the sensor line-of-sight at any given time for any given orbit, e.g., for a given geosynchronous orbit, and provides the position as an input to processor 910.

In one embodiment, motor input/output interface 930 receives one or more output signals for one or more motors 520, 540 from processor 910. In response thereto, motor input/output interface 930 provides one or more of these output signals to motors 520, 540 to either selectively rotate partial conical baffle tube 120 about the sensor line-of-sight, or selectively pivot visor 130 relative to partial conical baffle tube 120, or both.

In one embodiment, motor 520 may provide information regarding the position of partial conical baffle tube 120 to processor 910 via motor input/output interface 830. In one embodiment, motor 540 may provide information regarding the position of visor 130 to processor 910 via motor input/output interface 830. In one embodiment, the position information may be relayed by processor 910 to a spacecraft bus or to a ground station at any time. In case the light shade alignment to the sun is lost, re-synchronization with the sun can be achieved by sending new position commands from the ground station to the spacecraft bus and to processor 910. This will re-align light shade 100 to the sun.

In one embodiment, based on the input regarding the sun's position relative to the sensor line-of-sight, processor 910 determines an angle of solar illumination relative to the sensor (i.e., sun's radial angle and/or polar angle). Based on the determined radial and/or polar angle, processor 910 determines whether partial conical baffle tube 120 is to be rotated or visor 130 is to be pivoted. For example, in response to a determination that a radial angle of the solar illumination relative to sensor 620 is between the first angle and the second angle (the second angle being smaller than the first angle), equal to the second angle, equal to the third angle, or between the third angle and the fourth angle (the fourth angle being greater than the third angle), processor 910 may determine that visor 130 is to be pivoted and provides an output signal to motor input/output interface 730 to drive motor 540 to selectively pivot visor to the partially extended and/or fully extended positions relative to partial conical baffle tube in response to the radial angle. This is depicted in FIGS. 7C, 7D, 7G, and 7H, for example, as described above. At radial angles less than the second angle or equal to the fourth angle, for example, processor 910 may determine that visor 130 is to be pivoted and provides an output signal to motor input/output interface 930 to drive motor 540 to selectively pivot visor to the unused position relative to partial conical baffle tube in response to the radial angle. This is depicted in FIGS. 7E and 7I, for example, as described above. In one embodiment, visor 130 may always pivot in response to sun's radial angle. In one embodiment, visor 130 may pivot continuously or incrementally in response to the sun's radial angle.

In one embodiment, in response to a determined polar angle of the solar illumination relative to sensor 620, processor 910 may determine that partial conical baffle tube 120 is to be rotated and provides an output signal to motor input/output interface to drive motor 520 to selectively rotate partial conical baffle tube about the sensor line-of-sight in response to the polar angle. In one embodiment, partial conical baffle tube 120 may always rotate in response to sun's polar angle. In one embodiment, partial conical baffle tube 120 may rotate continuously or incrementally in response to the sun's polar angle. In one embodiment, partial conical baffle tube 120 has the ability to rotate 360 degrees about the sensor line-of-sight.

Figure 10:
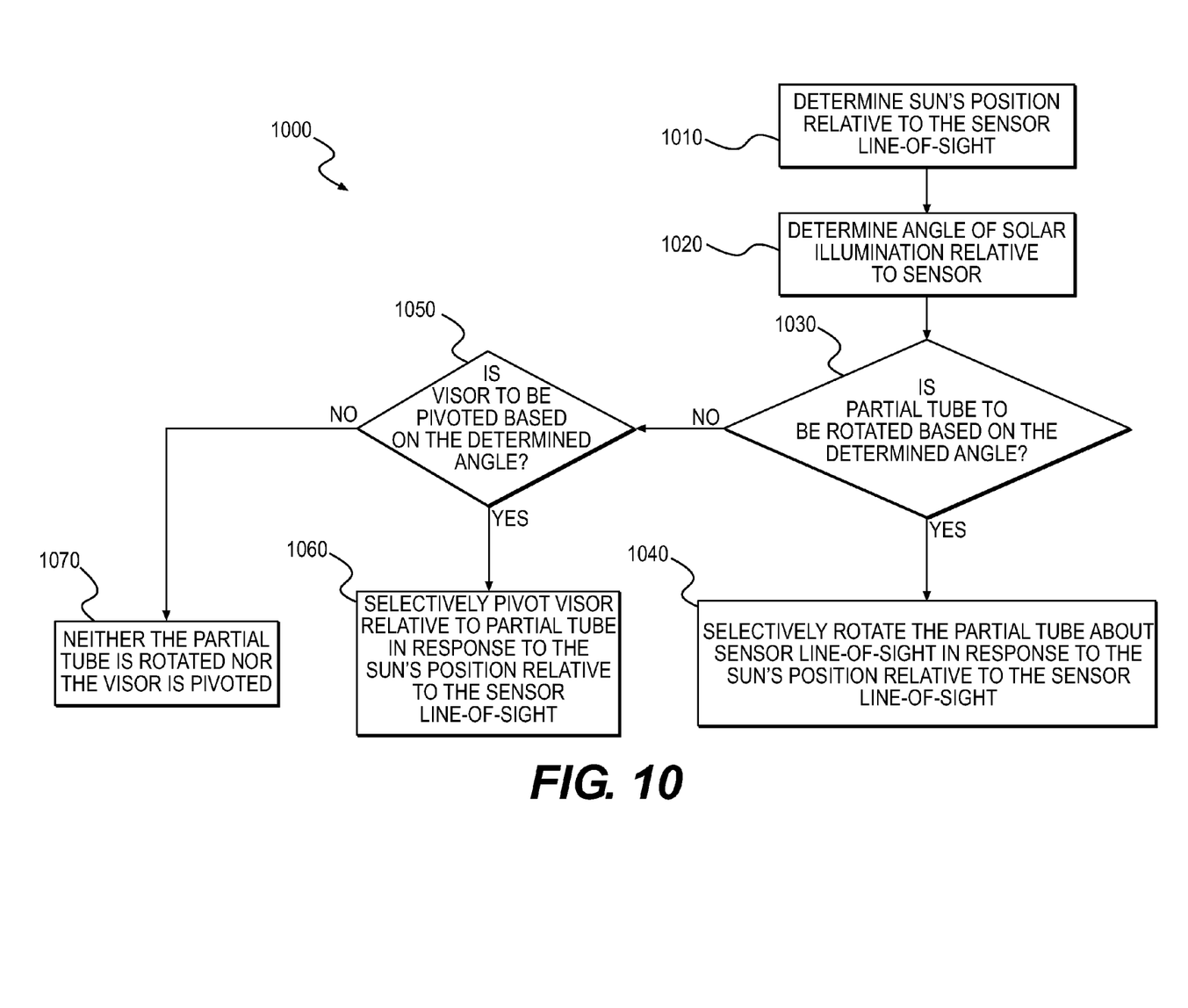
FIG. 10 provides a flowchart of a method of protecting elements of a space-based sensor from direct solar illumination by using a multi-axis articulated solar light shade, in accordance with an embodiment.

FIG. 10 depicts an exemplary flowchart of method 1000 of protecting optical element 640 of space-based sensor 620 from direct solar illumination by using light shade 100. It is noted that partial conical baffle tube 120 is referred to as partial tube 120 in FIG. 10 merely for compact representation. In operation 1010, the sun's position relative to sensor line-of-sight 610 is determined. As discussed above, in one embodiment, the sun's position relative to sensor line-of-sight 610 is pre-programmed and stored in memory 910. In one embodiment, the sun's position relative to sensor line-of-sight 610 is obtained from a sun position sensor.

In operation 1020, an angle of solar illumination relative to sensor 620 is determined, as discussed above. In operation 1030, a determination is made whether partial conical baffle tube 120 is to be rotated in response to the determined angle of solar illumination (for example, polar angle). In response to a determination that partial conical baffle tube 120 is to be rotated, partial conical baffle tube 120 is selectively rotated about sensor line-of-sight 610 in response to sun's position relative to the sensor line-of-sight in operation 1040. In one embodiment, partial conical baffle tube 120 is selectively rotated about sensor line-of-sight 610 in response to the polar angle of solar illumination. In response to a determination that partial conical baffle tube 120 is not to be rotated, a further determination is made, in operation 1050, whether visor 130 is to be pivoted in response to the determined angle of solar illumination (for example, radial angle). In response to a determination that visor 130 is to be pivoted, visor 130 is selectively pivoted relative to partial conical baffle tube 120 in response to the sun's position relative to the sensor line-of-sight in operation 1060. In one embodiment, visor 130 is selectively pivoted about relative to partial conical baffle tube 120 in response to the radial angle of solar illumination. In response to a determination that neither partial conical baffle tube 120 is to be rotated nor visor 130 is to be pivoted, there is no rotation or pivoting performed in operation 1070. In one embodiment, partial conical baffle tube 120 may be selectively rotated and visor 130 may be selectively pivoted so as to protect sensor 620 from the direct solar illumination at any given time, or orbital position.

In one embodiment, all moving components of light shade 100 described above may be constructed using lightweight materials to minimize their inertia, and consequently minimize structural transients that could couple into the optical bench of optical element 640 during accelerate/decelerate events. In one embodiment, light shade 100 may be attached with a direct load path to a space-based vehicle bus so that, in the event that a structural transient is generated, related vibrations and/or movement cannot directly couple to optical element's 640 optical bench.

In one embodiment, partial conical baffle tube 120 and visor 130 are oversized with respect to the optical element 640, depending on various configurations (for example, in FIGS. 8A, 8B and 8C), such that light shade to optical element positional stability and geometric tolerances do not significantly drive the cost.

In one embodiment, a highly reflective surface may be added to the sun side of the light shade 100 to minimize energy absorption. A highly emissive surface may be added to the opposing or shade side of light shade 100 such that the emissivity may be engineered to maintain light shade 100 at proper operating temperature and/or temperature range.

In one embodiment, light shade 100 may be used in space-based optical telescopes or cameras. In one embodiment, light shade 100 may be used in conjunction with a vision weather satellite.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A multi-axis articulated solar light shade, the light shade comprising:
    a base;
    a tapered partial conical baffle tube having a first end portion, a second end portion, an elongated curved portion defining a shade between the first and second end portions, and an opening defined in an interior of the elongated curved portion, the first end portion rotatably attached to the base; and
    a visor pivotably attached to the second end portion.

2. The light shade of claim 1, further comprising:
    a motor configured to rotate the partial conical baffle tube relative to the base.

3. The light shade of claim 1, further comprising:
    a motor configured to pivot the visor relative to the partial conical baffle tube.

4. The light shade of claim 3, further comprising:
    a pushrod attached to the visor, wherein the motor is configured to drive the pushrod to pivot the visor relative to the partial conical baffle tube.

5. The light shade of claim 1, wherein the elongated curved portion of the partial conical baffle tube comprises a tapered or conical configuration.

6. The light shade of claim 2, wherein the motor is arranged in the base.

7. The light shade of claim 3, wherein the motor is arranged in the base.

8. A method of protecting elements of a space-based sensor from direct solar illumination by using a multi-axis articulated solar light shade comprising a tapered partial conical baffle tube and a visor attached to an end portion of the partial conical baffle tube, the method comprising:
    selectively rotating the partial conical baffle tube about a sensor line-of-sight in response to the sun's position relative to the sensor line-of-sight; and
    selectively pivoting the visor relative to the partial conical baffle tube in response to the sun's position relative to the sensor line-of-sight,
    wherein the partial conical baffle tube is selectively rotated and the visor is selectively pivoted so as to protect the sensor from the direct solar illumination at any given time and any given orbital position.

9. The method of claim 8, wherein selectively rotating the partial conical baffle tube comprises selectively rotating the partial conical baffle tube about the sensor line-of-sight in response to a polar angle of the solar illumination relative to the sensor.

10. The method of claim 9, wherein selectively pivoting the visor comprises selectively pivoting the visor relative to the partial conical baffle tube in response to a radial angle of the solar illumination relative to the sensor.

11. The method of claim 8, wherein selectively pivoting the visor comprises selectively pivoting the visor relative to the partial conical baffle tube on an axis perpendicular to the sensor line-of-sight.

12. A system for protecting elements of a space-based sensor from direct solar illumination, the system comprising:
    a space-based sensor comprising an optical element; and
    a light shade comprising:
        a base;
        a tapered partial conical baffle tube having a first end portion, a second end portion, an elongated curved portion defining a shade between the first and second end portions, and an opening defined in an interior of the elongated curved portion, the first end portion rotatably attached to the base; and
        a visor pivotably attached to the second end portion,
    wherein the light shade is located around an aperture of the optical element and arranged to protect the optical element from the direct solar illumination.

13. The system of claim 12, wherein the optical element comprises a telescope.

14. The system of claim 12, further comprising:
    a processor configured to receive one or more inputs relating to the sun's position relative to a sensor line-of-sight and in response thereto, to provide one or more output signals to one or more motors that either selectively rotate the partial conical baffle tube about the sensor line-of-sight, or selectively pivot the visor relative to the partial conical baffle tube, or both.

15. The system of claim 14, further comprising:
    a memory containing pre-programmed information stored therein regarding the sun's position relative to the sensor line-of-sight.

16. The system of claim 14, wherein the one or more inputs comprise an input from a sun position sensor.

* * * * *